US009302557B2

(12) United States Patent
Alldredge et al.

(10) Patent No.: US 9,302,557 B2
(45) Date of Patent: Apr. 5, 2016

(54) FIFTH WHEEL LOCKING MECHANISM

(71) Applicant: Fontaine Fifth Wheel Company, Trussville, AL (US)

(72) Inventors: Steven Alldredge, Cullman, AL (US); Tim Johnson, Freeport, ME (US); Todd Shelton, Trussville, AL (US); Charles Rosato, Pell City, AL (US)

(73) Assignee: Fontaine Fifth Wheel, Trussville, AL (US)

( * ) Notice: Subject to any disclaimer, the term of this patent is extended or adjusted under 35 U.S.C. 154(b) by 15 days.

(21) Appl. No.: 14/100,417

(22) Filed: Dec. 9, 2013

(65) Prior Publication Data
US 2015/0158355 A1    Jun. 11, 2015

(51) Int. Cl.
*B60D 1/01*   (2006.01)
*B60D 1/28*   (2006.01)
*B62D 53/08*  (2006.01)
*B62D 53/10*  (2006.01)
*B62D 53/12*  (2006.01)
*B60D 1/58*   (2006.01)

(52) U.S. Cl.
CPC  *B60D 1/015* (2013.01); *B60D 1/28* (2013.01); *B62D 53/08* (2013.01); *B62D 53/10* (2013.01); *B62D 53/12* (2013.01); *B60D 1/58* (2013.01)

(58) Field of Classification Search
CPC ........ B62D 53/08; B62D 53/10; B62D 53/12; B60D 1/015; B60D 1/28
See application file for complete search history.

(56) References Cited

U.S. PATENT DOCUMENTS

| 2,044,227 | A | * | 6/1936 | Robb, Jr. | 280/436 |
| 2,142,748 | A | * | 1/1939 | Fontaine | 280/434 |
| 2,258,432 | A | * | 10/1941 | Winn | 280/432 |
| 2,371,750 | A | * | 3/1945 | Fontaine | 280/434 |
| 2,726,878 | A | * | 12/1955 | Fontaine | 280/434 |
| 3,022,091 | A | * | 2/1962 | Braunberger | 280/434 |
| 3,578,357 | A | * | 5/1971 | Bouman et al. | 280/434 |
| 3,844,584 | A | * | 10/1974 | Fontaine | 280/434 |
| 4,447,070 | A | * | 5/1984 | Inoue | 280/434 |

(Continued)

FOREIGN PATENT DOCUMENTS

| CA | 2330265 | A1 | * | 7/2001 | |
| GB | 929115 | | * | 6/1963 | B60F 1/00 |

(Continued)

*Primary Examiner* — Joseph Rocca
*Assistant Examiner* — Maurice Williams
(74) *Attorney, Agent, or Firm* — Andrus Intellectual Property Law, LLP

(57) ABSTRACT

A fifth wheel includes a top plate having a throat that is adapted to receive a kingpin of a trailer. The fifth wheel is equipped with a locking mechanism including a jaw slidably connected to the top plate and slidable between a closed position where the jaw blocks passage of a kingpin out of the throat of the fifth wheel and an open position where a kingpin may pass into and out of the throat of the fifth wheel. The jaw has an edge adapted to engage a kingpin positioned in the throat of the fifth wheel when the jaw is in the closed position. A release arm is pivotally attached to the top plate and the jaw. A trigger member is pivotally attached to the release arm and has a locking head. A main spring urges the jaw towards the closed position. A locking protrusion is attached to the top plate and is engaged by the locking head of the trigger member when the jaw is in the open position so as to prevent the jaw from moving into the closed position. A release member is pivotally attached to the distal end portion of the release arm.

25 Claims, 11 Drawing Sheets

(56) References Cited

U.S. PATENT DOCUMENTS

| | | | |
|---|---|---|---|
| 4,659,101 A * | 4/1987 | Buckley | 280/434 |
| 5,477,207 A * | 12/1995 | Frame et al. | 340/431 |
| 5,516,138 A * | 5/1996 | Fontaine | 280/434 |
| 7,651,113 B1 * | 1/2010 | Mann | 280/434 |
| 7,735,849 B1 * | 6/2010 | Mann | 280/433 |
| 7,770,910 B1 * | 8/2010 | Shirk, Jr. | 280/433 |
| 2002/0125684 A1 * | 9/2002 | Laarman | 280/433 |
| 2004/0145150 A1 * | 7/2004 | Yeakel | 280/433 |
| 2006/0220344 A1 * | 10/2006 | Kahrs et al. | 280/433 |
| 2007/0209879 A1 * | 9/2007 | Schmidt et al. | 184/6.19 |
| 2013/0307247 A1 * | 11/2013 | Keatley | 280/433 |
| 2014/0008893 A1 * | 1/2014 | Loukus et al. | 280/433 |

FOREIGN PATENT DOCUMENTS

| WO | WO 2004043741 A2 * | 5/2004 | |
| --- | --- | --- | --- |
| WO | WO 2005028290 A1 * | 3/2005 | B62D 53/08 |
| WO | WO 2010132798 A1 * | 11/2010 | B62D 53/08 |

* cited by examiner

FIFTH WHEEL LOCKING MECHANISM

FIELD OF THE INVENTION

The present invention relates generally to fifth wheels of the type used by tractor trucks to pull trailers and the like and, in particular, to a locking mechanism for a fifth wheel.

BACKGROUND

Towing vehicles, such as tractor trucks or semi-tractors and the like, are equipped with fifth wheel hitches which receive and engage the kingpins of trailers. The fifth wheel is positioned on the back of the tractor truck and features a top plate having a central throat equipped with a latching mechanism which engages the kingpin. The throat may be, for example, provided with an open end facing the rear of the truck. The kingpin extends downward from the underside of the leading end portion of the trailer. The engagement of the trailer kingpin by the fifth wheel is the primary means by which the trailer is pivotally connected to the tractor.

Terminal tractors, which may be tractor trucks or other vehicles equipped with a fifth wheel, are typically used to move trailers within a cargo yard, warehouse facility, or intermodal facility, as opposed to moving trailers on public roads. Terminal tractors serve a function in the trucking industry that is similar to switch engines or shunting locomotives in the railroad industry. The fifth wheels of terminal tractors are therefore subject to much more frequent hitching and unhitching operations than highway tractors. As a result, a need exists for fifth wheel locking mechanisms for terminal tractors, and similar applications, that are very robust, reliable and quick and easy to hitch and unhitch. It is also desirable for such fifth wheels to prevent, or at least minimize, false locking cases.

DETAILED DESCRIPTION OF EMBODIMENTS

Figure 1:
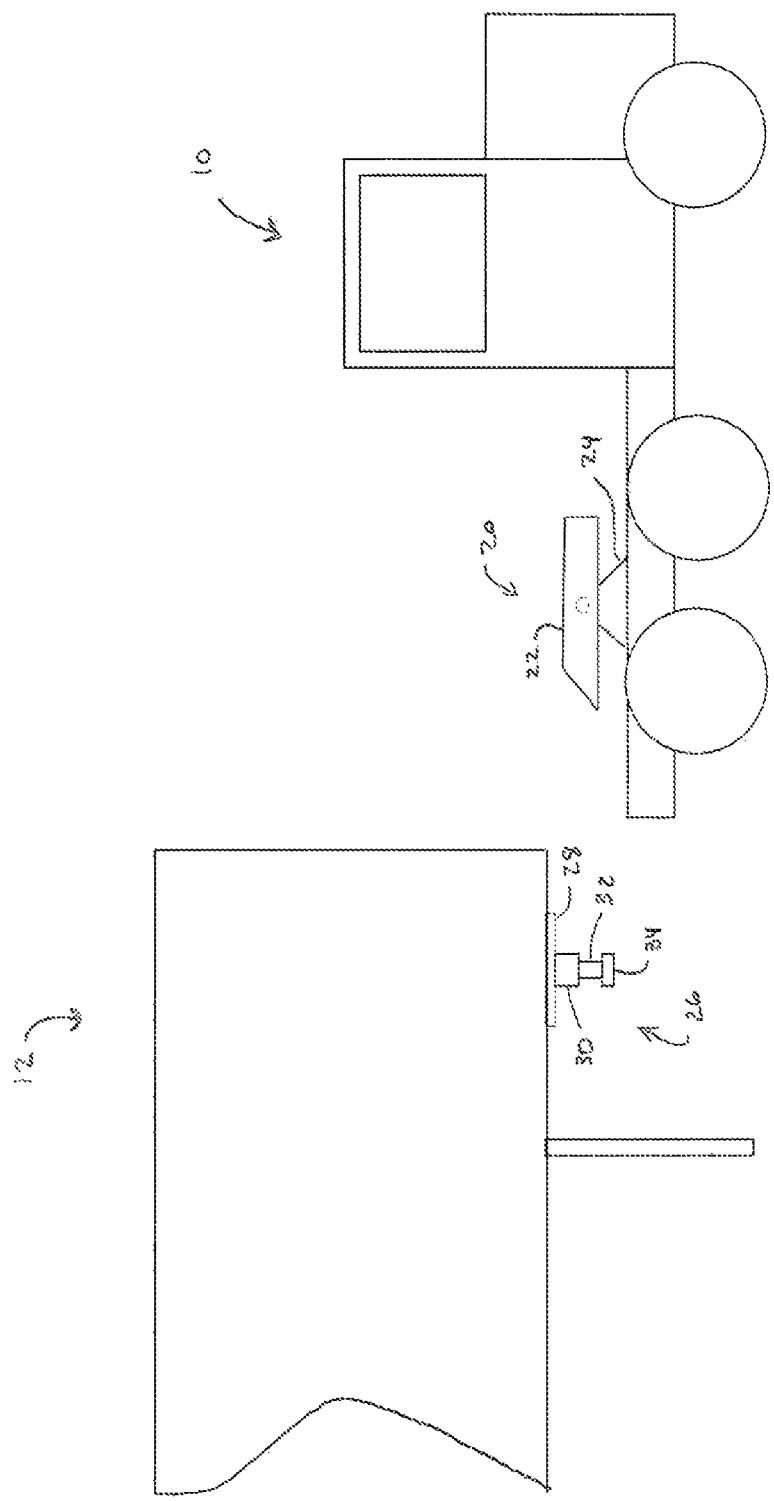
FIG. 1 is a simplified side elevational view of a tractor truck having a fifth wheel and a front portion of a trailer having a kingpin suitable for use with an embodiment of the fifth wheel locking mechanism of the present invention.

In accordance with an embodiment of the present invention, as illustrated in FIG. 1, a towing vehicle, such as a tractor truck indicated in general at 10, is positioned to begin the coupling process with regard to a trailer, indicated in general at 12. While the invention is described below in terms of a tractor truck being used as the towing vehicle and a semi-trailer being used as the trailer, it is to be understood that the present invention could be applied to other towing vehicle and trailer arrangements.

As illustrated in FIG. 1, and as known in the art, the truck is provided with a fifth wheel hitch, or simply "fifth wheel" indicated in general at 20, having a top plate 22 and a base 24 upon which the top plate is pivotally mounted. As is known in the art, the fifth wheel may be mounted in a fixed fashion on the truck frame rails or via a sliding mechanism so that the fore and aft position of the fifth wheel on the truck frame rails may be adjusted.

The trailer 12 features a kingpin, indicated in general at 26. The kingpin typically extends downward from a trailer bearing plate 28 which rests upon the top surface of the top plate 22 of the fifth wheel when the kingpin is received within the fifth wheel as described below. The kingpin typically features an upper collar portion 30, a middle shank portion 32, which features a reduced diameter, and a bottom flange portion 34.

Figure 2:
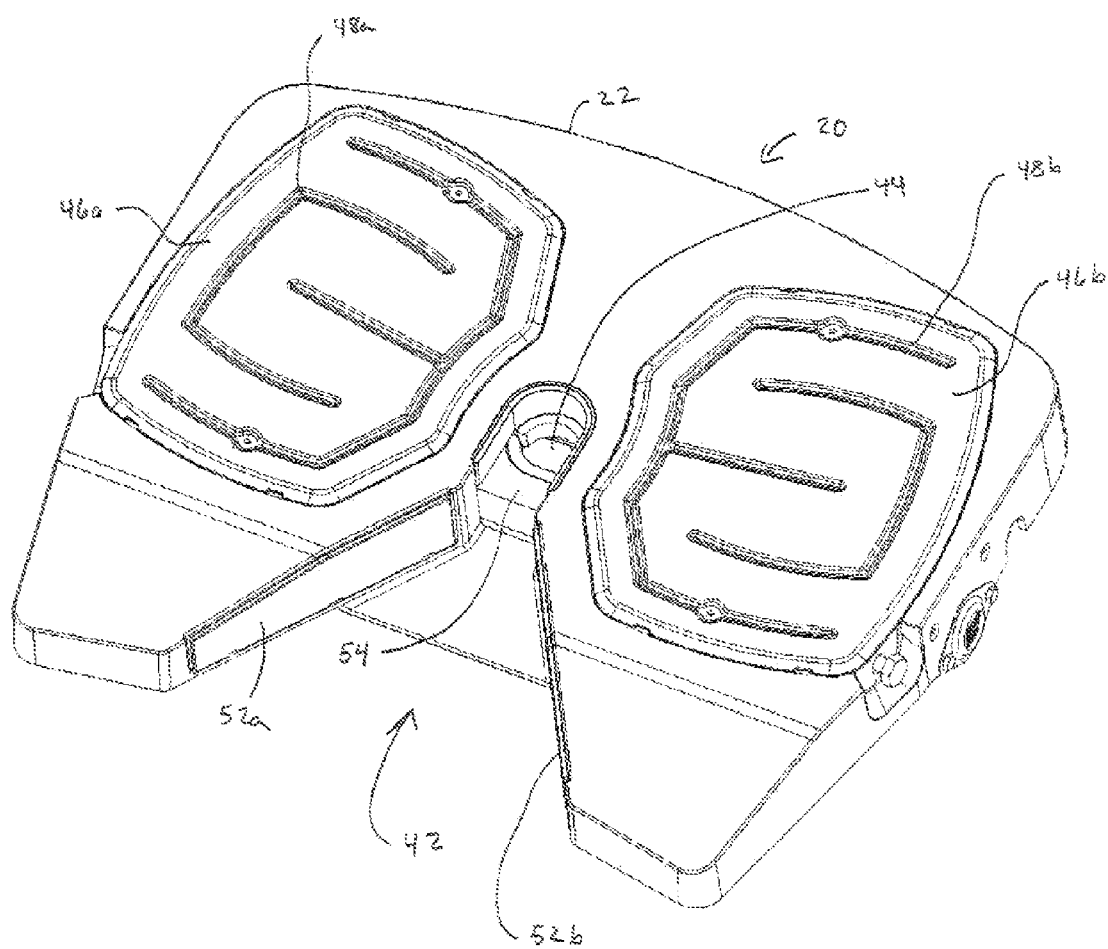
FIG. 2 is a top perspective view of a fifth wheel in an embodiment of the invention with the locking mechanism in a closed configuration.

As illustrated in FIG. 2, the fifth wheel top plate 22 is provided with a rearward facing, generally V-shaped opening or mouth, indicated in general at 42, that leads to the fifth wheel throat 44. As described in greater detail below, the fifth wheel is provided with a locking mechanism that automatically and/or manually engages and locks the trailer kingpin within the throat of the fifth wheel to couple the trailer to the tractor truck.

The top surface of the top plate 22 is provided with top wear plates 46a and 46b, which preferably include grease grooves 48a and 48b for optimally retaining applied grease. Mouth wear plates 52a and 52b are affixed to the inside surfaces of the mouth of the fifth wheel.

Figure 3:
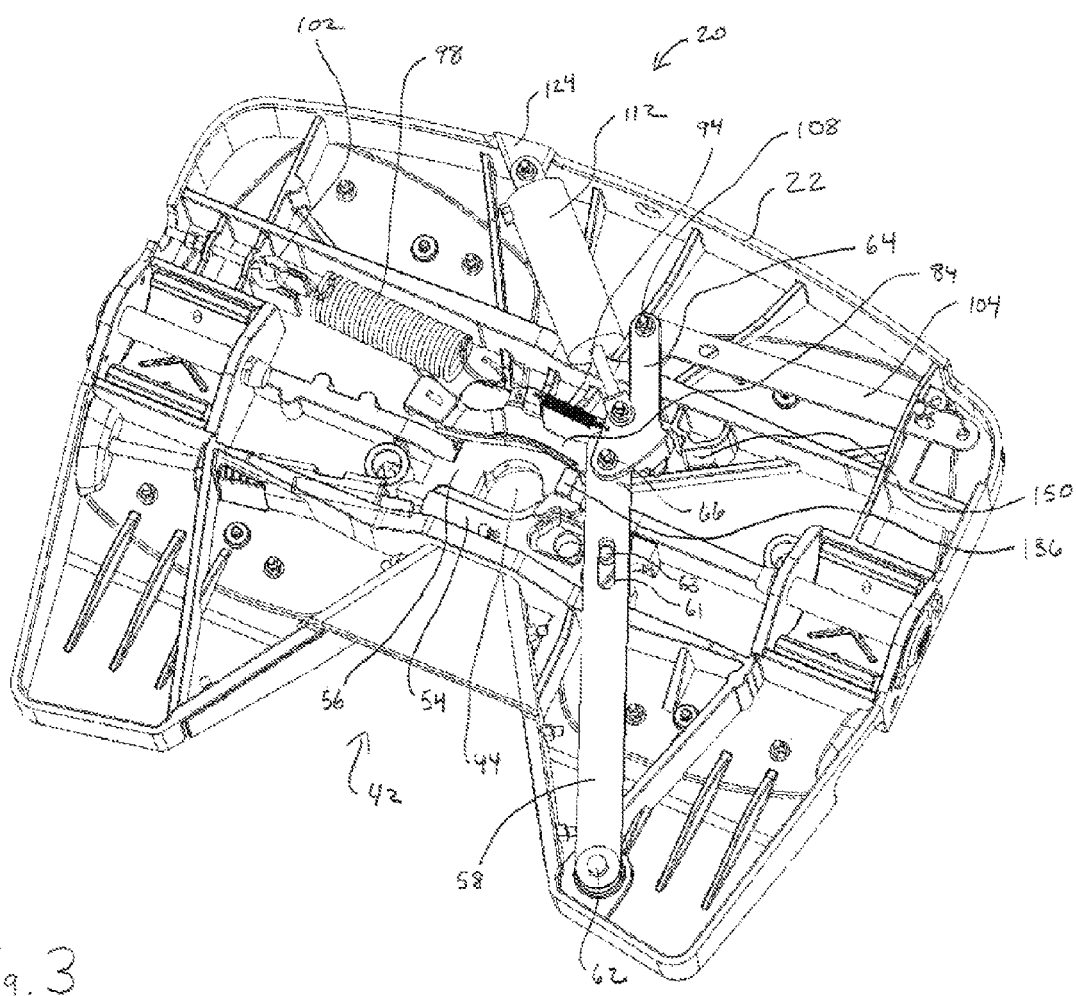
FIG. 3 is a bottom perspective view of the fifth wheel of FIG. 2.

As illustrated in FIG. 3, a locking mechanism is mounted to the underside of the top plate 22. The locking mechanism uses a sliding deadbolt or jaw 54 to lock a trailer kingpin into the throat of the fifth wheel. The locking mechanism is spring loaded in the closed configuration, illustrated in FIGS. 2 and 3. The jaw 54 cooperates with a stationary front jaw or member 56 to hold the kingpin in place during transit.

In addition to sliding jaw 54, the locking mechanism includes a release arm 58 that is pivotally connected by a proximal end to the underside of the top plate, such as by bolt 62. The release arm 58 includes an elongated slot 61 which receives a pin 63 that is attached to the jaw 54. As a result, as the release arm pivots about bolt 62, the jaw 54 slides between a closed position, where the passageway between the fifth wheel mouth and throat is blocked, illustrated in FIGS. 2 and 3, and an open position, where the passageway between the fifth wheel mouth and throat is not blocked.

Figure 4:
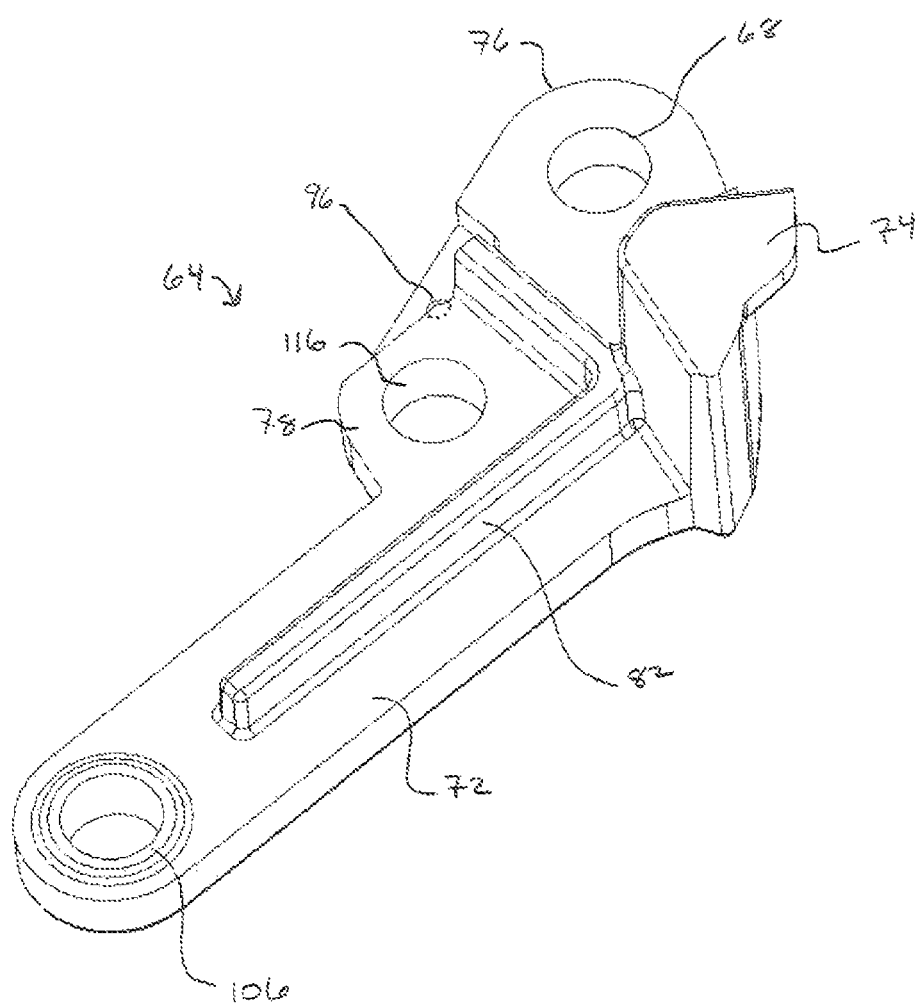
FIG. 4 is an enlarged isolated perspective view of the secondary lock latch of FIG. 3.

A secondary lock latch 64 is pivotally connected to a distal end of the release arm by a bolt 66, which engages an opening 68 (FIG. 4) formed in the latch 64. In addition to opening 68, with reference to FIG. 4, the secondary lock latch 64 includes a pull arm 72, a secondary lock pawl 74 and an elbow portion 76. Positioned between the pull arm and the elbow portion is a corner portion 78. A strengthening rib 82 is preferably provided along at least a portion of the pull arm 72 and between the elbow and corner portions 76 and 78.

Figure 5:
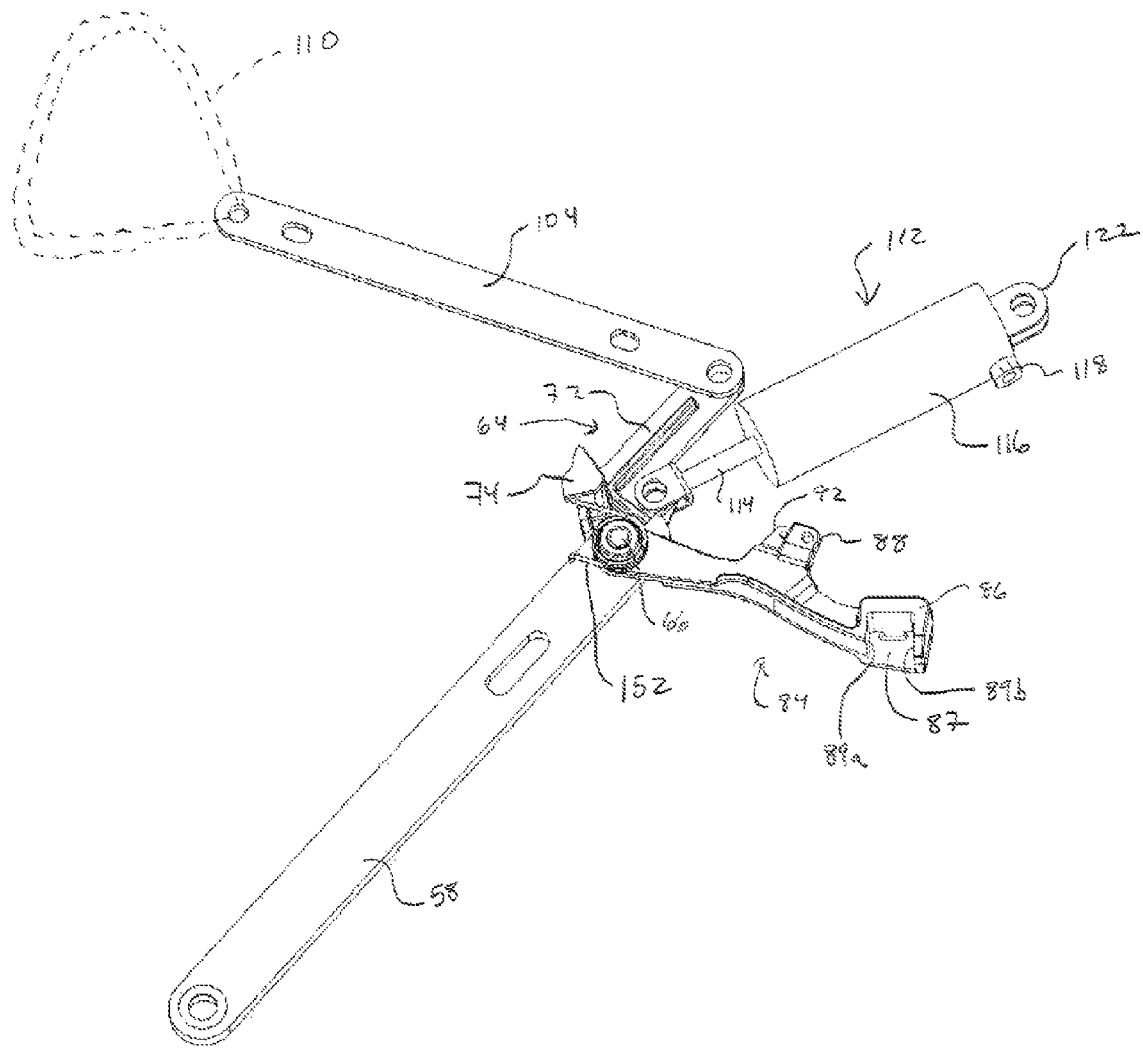
FIG. 5 is an enlarged isolated perspective view of the assembled release arm, secondary lock latch, trigger member, manual release bar and pneumatic release cylinder of FIG. 3.

Returning to FIG. 3, a trigger member 84 is also pivotally attached by a proximal end to the release arm 58 by bolt 66. As illustrated in FIG. 5, the trigger member 84 includes a locking head portion 86 at a distal end that contains a locking socket 87, having proximal wall 89a and distal wall 89b. The trigger member also includes a middle portion provided with tabs 88 and 92, both of which are provided with openings.

As illustrated in FIG. 3, a tension spring 94 has a first end connected to the opening of trigger member tab 92 and a second end attached to opening 96 (FIG. 4) of the secondary lock latch 64. A larger main tension spring 98 (FIG. 3) engages the opening of trigger member tab 88 (FIG. 5) at a first end, while, as illustrated in FIG. 3, the second end of the main spring 98 engages an eye bolt 102 secured to the top plate 22. It should be noted that the first end of the main spring 98 is shown disconnected from the opening of tab 88 of the release member in FIG. 3 to improve clarity of the illustration.

As illustrated in FIGS. 3 and 5, a manual release bar 104 is pivotally attached at a proximal end to opening 106 (FIG. 4) of latch 64 via bolt 108 (FIG. 3). The distal end of the manual release bar 104 is preferably provided with a release handle, illustrated in phantom at 110 in FIG. 5, that extends out from under the fifth wheel top plate 22 for access by a user.

A pneumatic release cylinder 112 (FIGS. 3 and 5) features a piston rod 114 that is pivotally attached to opening 116 (FIG. 4) of the corner portion of the latch 64. As illustrated in FIG. 5, the cylinder portion 116 of the pneumatic release cylinder includes a port 118 through which pressure within the cylinder may be increased or decreased to move the piston rod. The port 118 is connected to a source of pressurized air, which may be activated or deactivated by the user to control actuation of the pneumatic release cylinder, and thus the locking mechanism, as will be described in greater detail below. The pneumatic release cylinder includes a tab 122 which is pivotally mounted to a bracket 124 (FIG. 3) formed within or attached to the top plate.

Figure 6A:
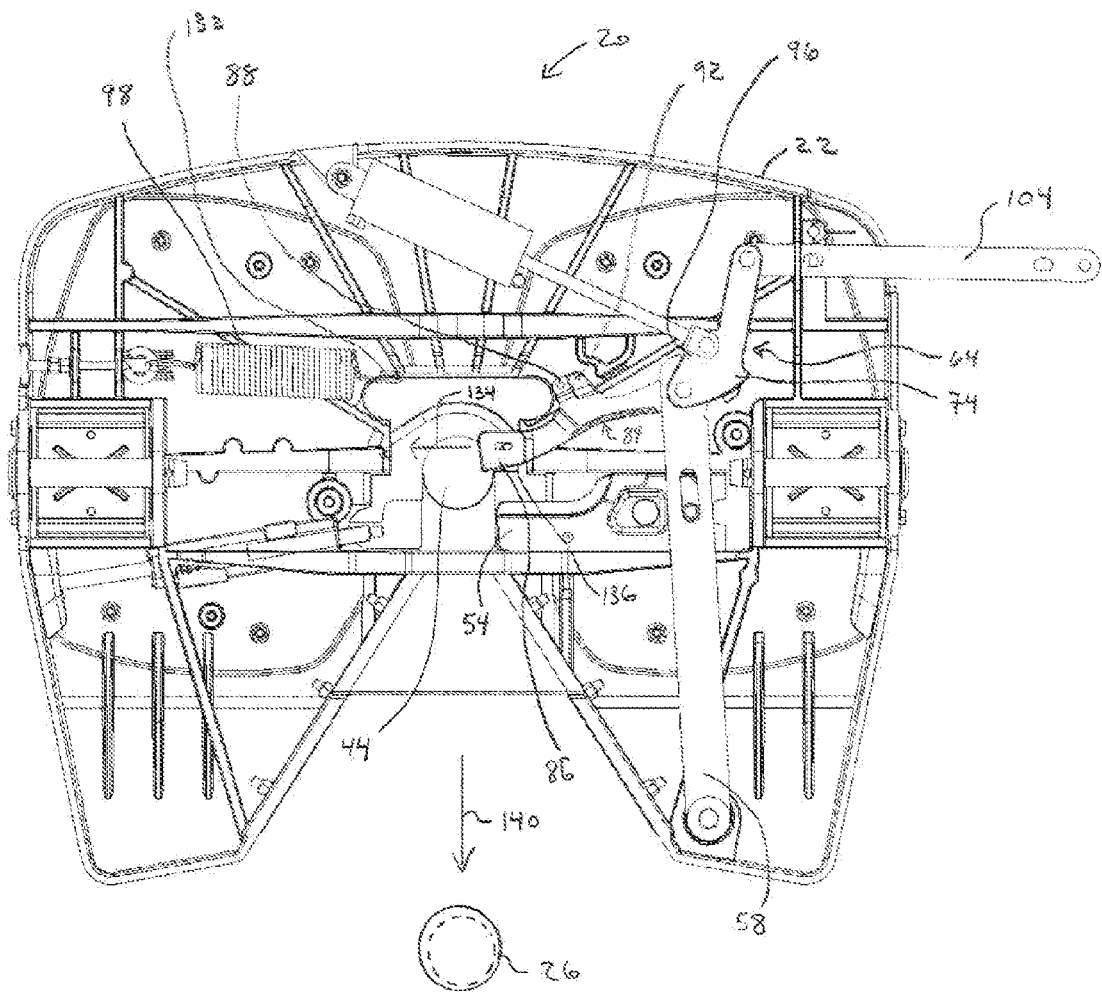
FIGS. 6A-6C are bottom plan views of the fifth wheel of FIGS. 2 and 3 with the locking mechanism in an open and armed, opened and unarmed and closed configurations, respectively.

In operation, the locking mechanism described above is initially in the open and armed configuration illustrated in FIG. 6A. More specifically, the fifth wheel is prepared to receive the kingpin of a trailer so that the tractor truck or other pulling vehicle may be coupled to the trailer.

Figure 6B:
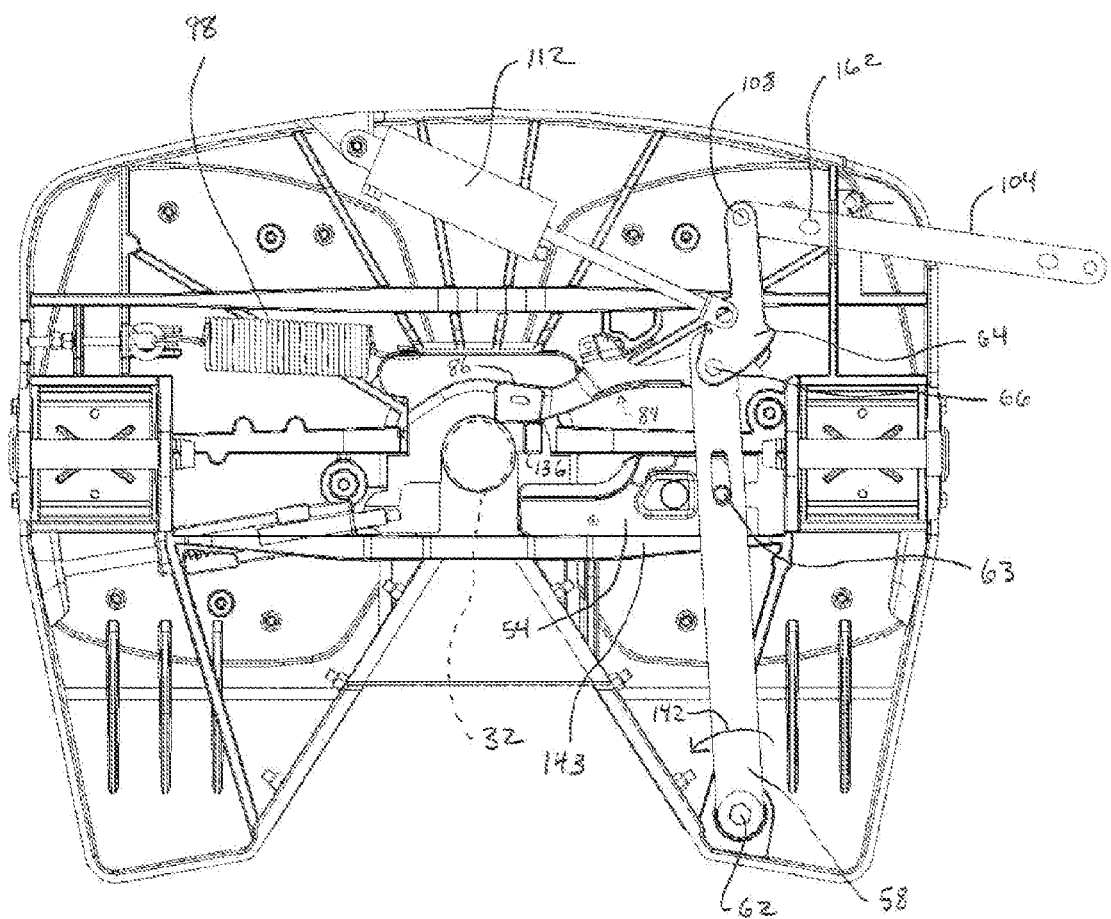
Figure 6C:
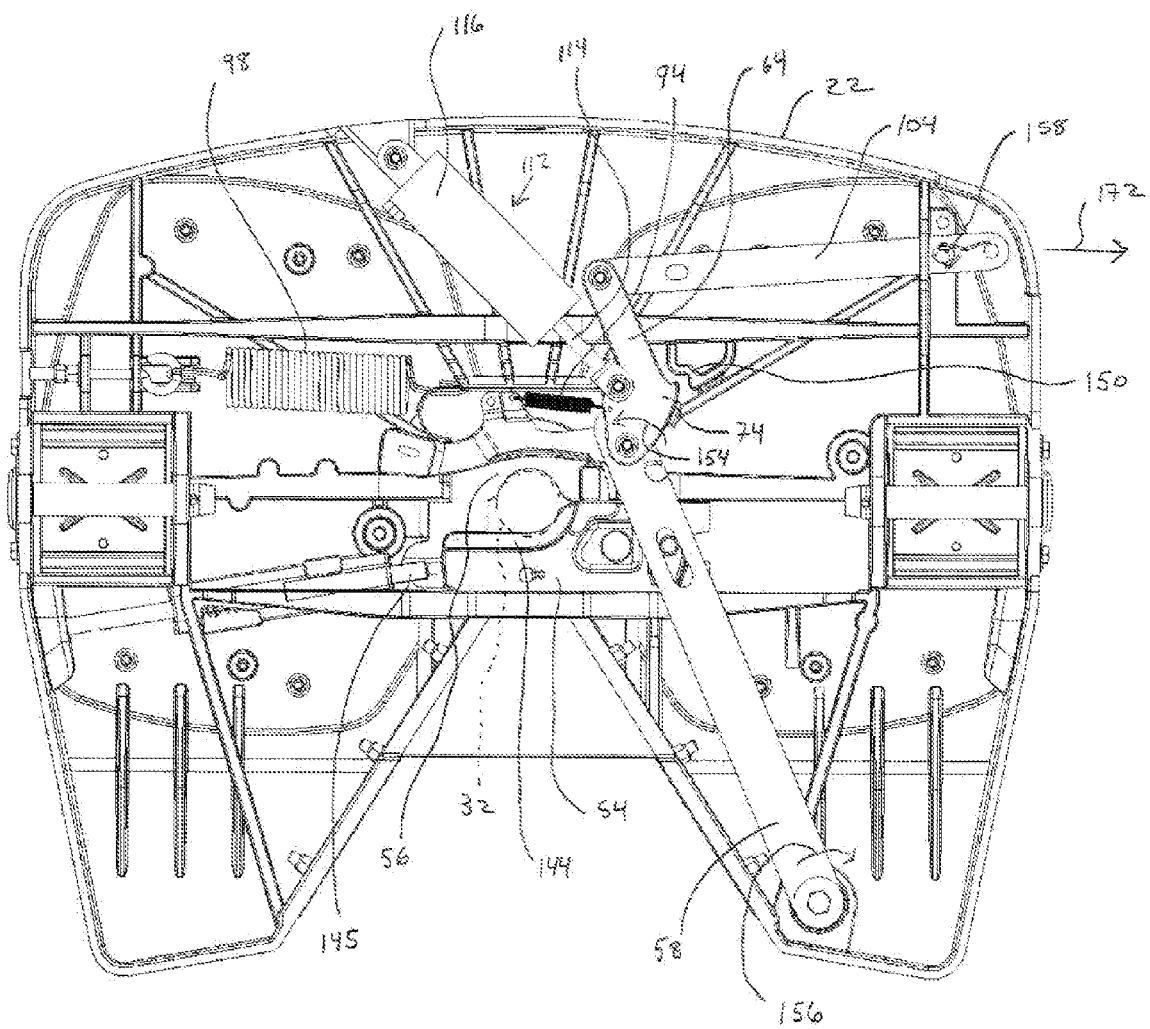

It should be noted that the main tension spring 98 is shown in FIGS. 6A-6C with the first end 132 disconnected from the tab 88 of the trigger member for clarity. In actuality, the first end 132 of the spring 98 is connected to the tab 88 of the trigger member and is actually held in tension when the locking mechanism is in the open and armed configuration illustrated in FIG. 6A. In addition, the tension spring 94 of FIG. 3 has been omitted from FIGS. 6A and 6B for clarity, but it should be understood that the spring is connected between tab 92 of the trigger member and the opening 96 of the secondary lock latch 64. As a result, the spring 94 of FIG. 3 would also be in a tension state in the open and armed configuration of FIG. 6A.

When in the open and armed configuration of FIG. 6A, due to the tension force of main spring 98, the trigger member is pulled in the direction of arrow 134. Motion in this direction is prevented, however, due to the engagement of the proximal wall 89a (FIG. 5) of the locking socket (87 in FIG. 5) of the head 86 of the trigger member with a locking protrusion 136 (also shown in FIG. 3) that extends downward from the bottom surface of the fifth wheel top plate 22. A portion of the head 86 of the trigger member extends into the throat 44 of the fifth wheel.

As a result of the position of the trigger member 84 illustrated in FIG. 6A, the release arm 58 is positioned so that the jaw 54 is held in a position where it does not block the passageway between the fifth wheel mouth 42 and throat 44.

As illustrated in FIG. 1, the fifth wheel 20 is mounted to a tractor truck or other pulling vehicle. To couple a trailer (such as 12 in FIG. 1) to the pulling vehicle, the driver backs the pulling vehicle towards the trailer kingpin 26 as illustrated by arrow 140 in FIG. 6A. As the shank portion of the kingpin 26 enters the throat 44 of the fifth wheel, the flange of the kingpin engages the locking head 86 of the trigger member 84 and moves it to the position illustrated in FIG. 6B (the shank portion 32 of the kingpin is indicated in phantom in FIG. 6B). As a result, the locking socket of the head 86 of the trigger member is moved off of locking protrusion 136, and main spring 98 is free to pull the trigger member in the direction of arrow 134 (of FIG. 6A). As this occurs, the release arm 58 pivots in the direction of arrow 142 of FIG. 6B, and jaw 54 is pushed via pin 63 to slide along sliding support 143 (FIG. 6B) into the closed position illustrated in FIG. 6C (and FIGS. 2 and 3). This results in the locking mechanism being in the closed configuration with the shank portion 32 of the trailer kingpin being locked within the fifth wheel so that the pulling vehicle and trailer are coupled. A micro-switch 145 (FIG. 6C) detects that the jaw 54 is in the closed position and provides a signal to the driver of the pulling vehicle, such as a visual and/or audible in the cab of the pulling vehicle, so that the driver knows the locking mechanism is in the closed configuration.

The jaw 54 preferably includes a tapered and curved edge 144 to facilitate and ensure engagement between the jaw and the kingpin. As the trailer is pulled by the pulling vehicle, towing forces (forces in the direction of the jaw 54) are transmitted directly onto the curved surface 144 of the jaw that interfaces with the kingpin. These forces are distributed over the span of the jaw and transmitted into the top plate 22.

While the closed configuration of FIG. 6C is supported by the force of main spring 98, additional locking is provided by the secondary lock latch 64. More specifically, as the release arm 58 moves from the position illustrated in FIG. 6B to the position illustrated in FIG. 6C, the pawl 74 of the secondary lock latch is moved in a position to engage a locking notch 150 (FIGS. 3 and 6C) formed on the bottom surface of the top plate 22. A torsion spring, illustrated at 152 in FIG. 5, features one end that engages the release arm 58 and another end that engages the pawl portion 74 of the secondary lock latch. The action of the torsion spring, in combination with the tension force of spring 94, causes the latch 64 to pivot about the distal end of the release arm 58 in the direction of arrow 154 of FIG. 6C so that the pawl 74 engages the notch 150. As a result, the release arm 58 is prevented from rotating in the direction of arrow 156 thus further locking the jaw 54 in the closed position illustrated in FIG. 6C. This secondary locking prevents the jaw 54 from retracting from the closed position due to friction during turning or other potential jarring or impact forces.

An additional tertiary lock is available by way of manually inserting a locking pin 158 (FIG. 6C) into a hole in the top plate 22 as well as an opening 162 (FIG. 6B) formed in the manual release bar 104 in order to create a positive lock between the two. Engaging this tertiary lock prevents the locking mechanism from opening while in transit, even in the event that the pneumatic release cylinder is activated in the manner described below.

When the driver or other user wishes to uncouple the trailer from the pulling vehicle, and thus remove the kingpin from the fifth wheel, the pneumatic release cylinder 112 is activated so that the piston rod 114 moves out of the cylinder 116. This causes the secondary lock latch 64 to rotate about the distal end of the release arm 58 in the clockwise direction (i.e. in the direction opposite of arrow 154). As a result, the pawl 74 of the latch is removed from engagement with notch 150, and the release arm is rotated about bolt 62 in the clockwise direction (i.e. in the direction opposite arrow 142 in FIG. 6B) into the position illustrated in FIG. 7, and the jaw 54 is pulled to the right into the open position. In addition, the head 86 of the trigger member drops down onto the locking protrusion 136 so that the locking protrusion is positioned adjacent to the distal wall 89*b* (FIG. 5) of the locking socket (87 of FIG. 5). At this point, the locking mechanism is in the open and unarmed configuration.

Figure 7:
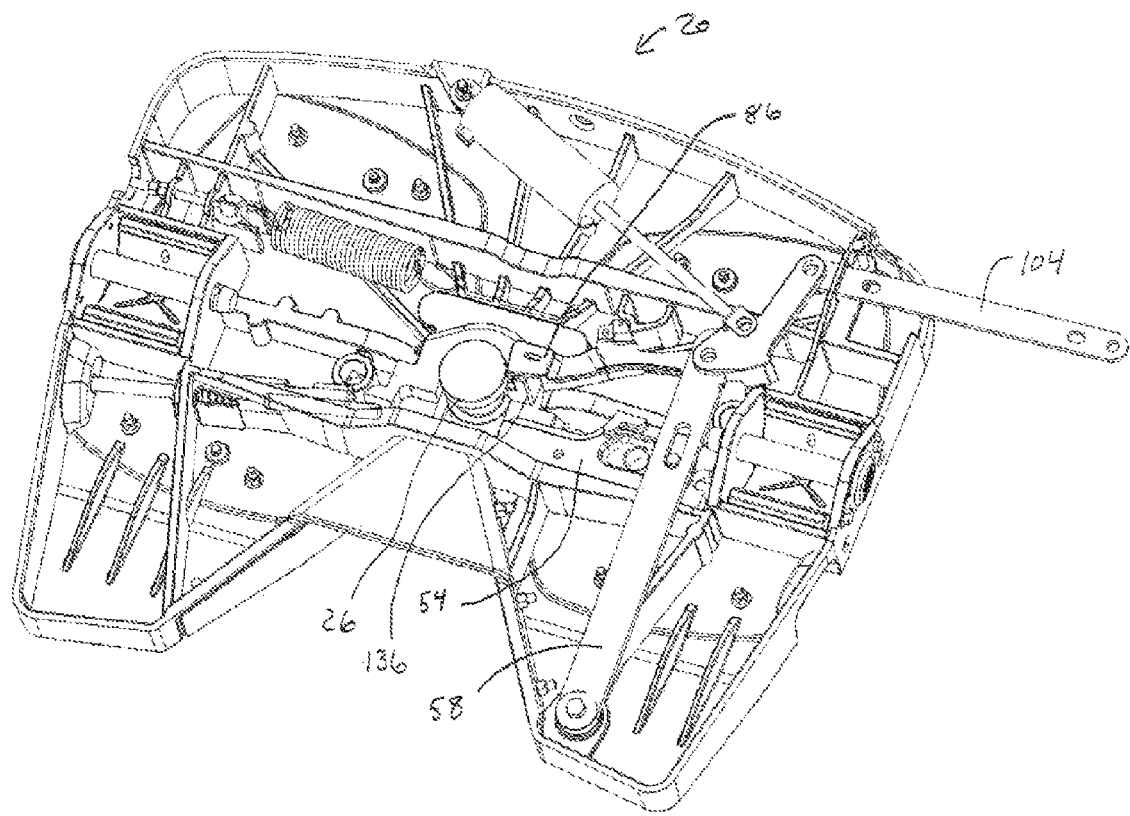
FIG. 7 is a bottom perspective view of the fifth wheel of FIGS. 2, 3 and 6A-6C with the locking mechanism in the open and unarmed configuration.

When in the opened and unarmed configuration illustrated in FIG. 7, the head 86 of the trigger member rests against the flange of the kingpin and holds the mechanism open until the kingpin is removed from the fifth wheel. After the kingpin is removed, and the trailer and the pulling vehicle are uncoupled, the head 86 of the trigger member moves to the left (in the direction of arrow 134 of FIG. 6A) so that the locking protrusion 136 once again engages the proximal wall 89*a* (FIG. 5) of the locking socket (87 in FIG. 5). As a result, the locking mechanism is once again in the open and armed configuration illustrated in FIG. 6A.

As an alternative to the use of the pneumatic release cylinder 112, or in the event of a failure of the cylinder, there is the option of manually releasing the secondary lock and opening the mechanism via the use of manual release bar 104. More specifically, with reference to FIG. 6C, pulling the manual release bar in the direction of arrow 172 (with tertiary locking pin 158 removed) will cause the secondary lock latch 64 to rotate about the distal end of the release arm 58 in the clockwise direction (i.e. in the direction opposite of arrow 154) so as to disengage the secondary locking pawl allowing the mechanism to move into the opened and unarmed configuration illustrated in FIG. 7 with a single pull.

Figure 8:
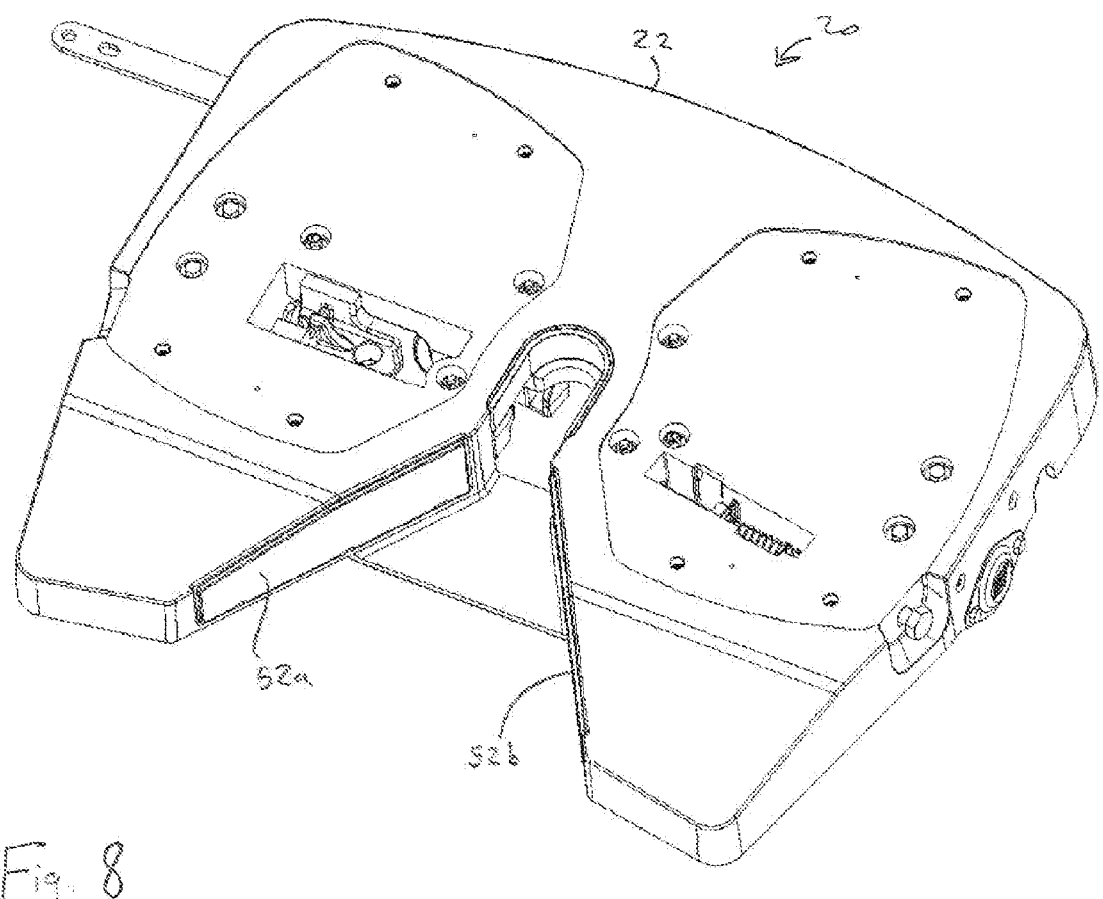
FIG. 8 is top perspective view of the fifth wheel of FIGS. 2, 3 and 6A-6C with the top wear plates removed.
Figure 9:
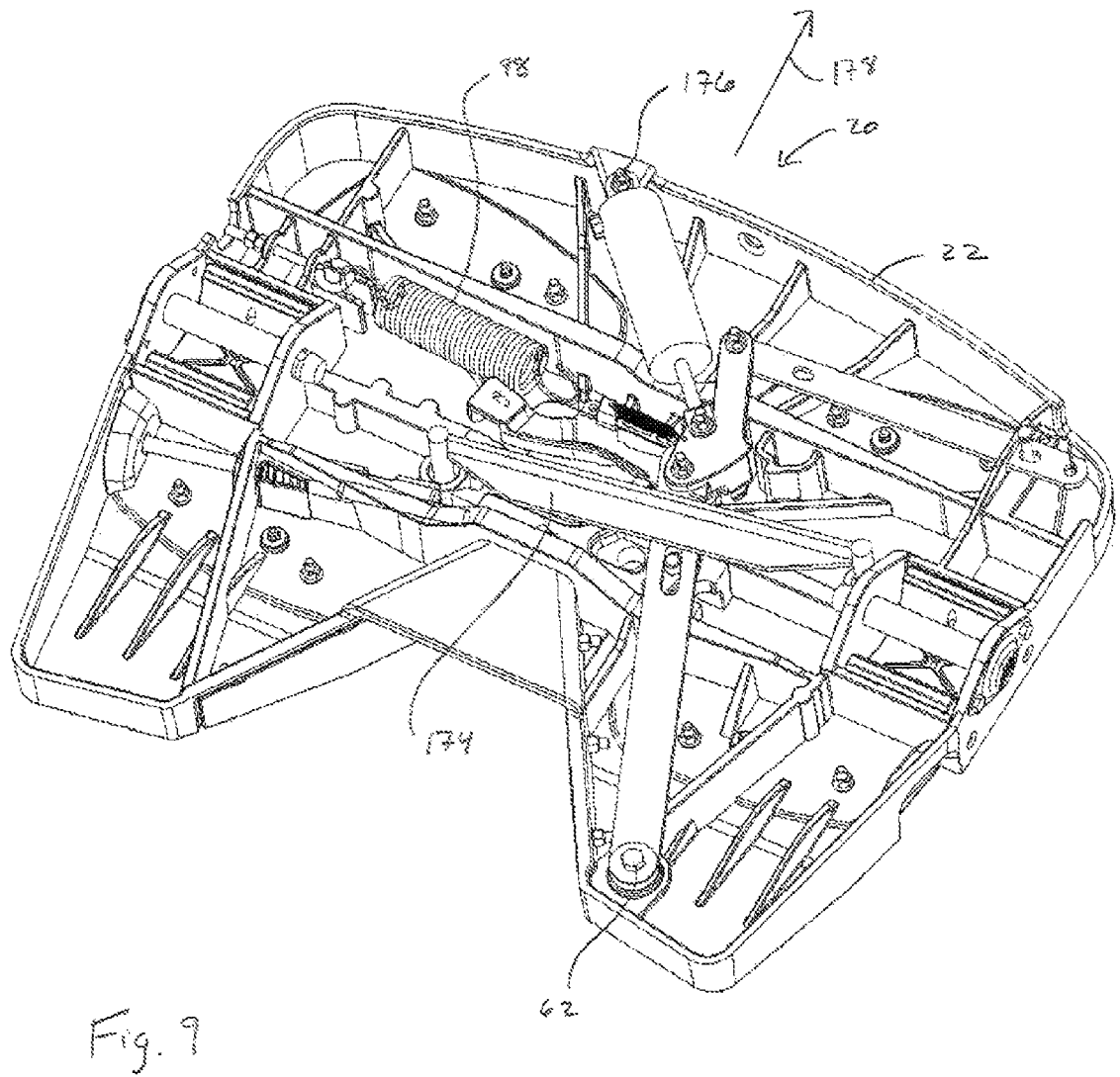
FIG. 9 is a bottom perspective view of the fifth wheel of FIG. 3 with a retaining bracket.

The locking mechanism described above offers several advantages in terms of maintenance and service. The jaw 54 is replaceable while the fifth wheel is assembled to the truck or other pulling vehicle, after removal of the wear plates, which is illustrated in FIG. 8. The internal linkage illustrated in FIG. 5, including the release arm 58, trigger member 84, secondary lock latch 64, manual release bar 104 and pneumatic cylinder 112, can be replaced after the removal of a retaining bracket 174, illustrated in FIG. 9 as added to the fifth wheel of FIG. 3, and screws 62 and 176 on the bottom perimeter of the top plate 22. The internal linkage may be dropped out the bottom of the fifth wheel and slid forward, in the direction of arrow 178 of FIG. 9, for removal and servicing. The stationary front jaw (56 of FIG. 3) can be removed and replaced after removal of sliding jaw 54, retaining bracket 174 (FIG. 9) and a release bolt and detachment of the main spring 98.

As shown for the top wear plates in FIG. 8, the mouth wear plates 52*a* and 52*b* may also be removed from the top plate 22 for repair or replacement.

While the preferred embodiments of the invention have been shown and described, it will be apparent to those skilled in the art that changes and modifications may be made therein without departing from the spirit of the invention, the scope of which is defined by the appended claims.

What is claimed is:

1. A fifth wheel comprising:
a throat that is adapted to receive a kingpin of a trailer;
a top plate adapted to cover a top of the fifth wheel except for the throat; and
a locking mechanism having:
a jaw slidable between a closed position where the jaw blocks removal of a kingpin from the throat and an open position permitting removal of the kingpin from the throat, said jaw having an edge adapted to engage the kingpin positioned in the throat of the fifth wheel when the jaw is in the closed position;
a release arm having a proximal end portion, a distal end portion and a middle portion positioned between the proximal and distal end portions, said proximal end portion of the release arm pivotally attached to the fifth wheel and said middle portion of the release arm pivotally attached to the jaw;
a trigger member having a proximal end portion and a distal end portion, said proximal end portion of the trigger member pivotally attached to the release arm;
a bias device urging the jaw towards the closed position; and
a release member pivotally attached to the distal end portion of the release arm and configured to slide the jaw from the closed position to the open position;
wherein the proximal end portion of the release arm is below a bottom perimeter of the top plate and is pivotally attached at or below the bottom perimeter of the top plate via a first removable element, and wherein an end portion of the release member is below the bottom perimeter of the top plate and is connected at or below the bottom perimeter of the top plate via a second removable element such that the jaw, release arm, trigger member, and release member are removable from the fifth wheel while the fifth wheel is assembled to a vehicle.

2. The fifth wheel of claim 1, wherein the bias device is a spring and the release member is a pneumatic cylinder.

3. The fifth wheel of claim 2, wherein the first removable element and the second removable element are removable screws.

4. The fifth wheel of claim 1, wherein at least the release arm, the trigger member, and release member are removable as a unit from a bottom of the fifth wheel while the fifth wheel is assembled to the vehicle after removal of the first removable element and the second removable element.

5. The fifth wheel of claim 1, wherein the jaw has at least one opening therein that enables a user to grip the jaw.

6. The fifth wheel of claim 5, wherein the opening comprises one or more holes or edge grooves.

7. The fifth wheel of claim 1, further comprising one or more top wear plates removably fixed to a top surface of the top plate.

8. The fifth wheel of claim 7, wherein the jaw has at least one opening therein that enables a user to grip the jaw when the top wear plates are removed.

9. The fifth wheel of claim 1, further comprising at least one of a throat wear plate removably attached to the top plate and a mouth wear plate removably attached to a side surface of the top plate adjacent to the throat.

10. The fifth wheel of claim 1, further comprising a switch that detects when the jaw is in the closed position and provides an indication signal.

11. A fifth wheel comprising:
a top plate having a throat that is adapted to receive a kingpin of a trailer;
a jaw slidably connected to the top plate and slidable between a closed position where the jaw blocks passage of a kingpin out of the throat of the fifth wheel and an open position where a kingpin may pass into and out of the throat of the fifth wheel, said jaw having an edge adapted to engage a kingpin positioned in the throat of the fifth wheel when the jaw is in the closed position;
a release arm having a proximal end portion, a distal end portion and a middle portion positioned between the proximal and distal end portions, said proximal end portion of the release arm pivotally attached to the top plate and said middle portion of the release arm pivotally attached to the jaw;

a trigger member having a proximal end portion and a distal end portion, said proximal end portion of the trigger member pivotally attached to the release arm;

a locking head positioned on the distal end portion of the trigger member;

a main spring urging the jaw towards the closed position;

a locking protrusion attached to the top plate, said locking protrusion shaped and positioned to be engaged by the locking head of the trigger member when the jaw is in the open position so as to prevent the jaw from moving into the closed position;

a release member pivotally attached to the distal end portion of the release arm;

a secondary lock latch pivotally attached to the distal end portion of the release arm and a locking notch attached to the top plate of the fifth wheel, said secondary lock latch pivotable between a locked position where it engages the locking notch and an unlocked position where it does not engage the locking notch;

a manual release bar pivotally attached to the secondary latch member so that the secondary lock latch is pivoted from the locked position to the unlocked position when the manual release bar is actuated; and a tertiary locking pin;

wherein the top plate includes a tertiary locking hole and the manual release bar includes a tertiary locking opening, said tertiary locking hole and opening being in alignment when the jaw is in the closed condition with the tertiary locking pin removably positioned there through so as to provide a tertiary lock.

12. The fifth wheel of claim 11, further comprising a spring urging the secondary lock latch into engagement with the locking notch.

13. The fifth wheel of claim 12, wherein the spring is a torsion spring positioned at a pivotal connection between the secondary lock latch and the release arm, said torsion spring having a first end engaging the secondary lock latch and a second end engaging the release arm.

14. The fifth wheel of claim 12, wherein the spring is a tension spring connected between the secondary lock latch and the trigger member.

15. A fifth wheel comprising:
a top plate having a throat that is adapted to receive a kingpin of a trailer;

a jaw slidably connected to the top plate and slidable between a closed position where the jaw blocks passage of a kingpin out of the throat of the fifth wheel and an open position where a kingpin may pass into and out of the throat of the fifth wheel, said jaw having an edge adapted to engage a kingpin positioned in the throat of the fifth wheel when the jaw is in the closed position;

a release arm having a proximal end portion, a distal end portion and a middle portion positioned between the proximal and distal end portions, said proximal end portion of the release arm pivotally attached to the top plate and said middle portion of the release arm pivotally attached to the jaw;

a trigger member having a proximal end portion and a distal end portion, said proximal end portion of the trigger member pivotally attached to the release arm;

a locking head positioned on the distal end portion of the trigger member;

a main spring urging the jaw towards the closed position;

a locking protrusion attached to the top plate, said locking protrusion shaped and positioned to be engaged by the locking head of the trigger member when the jaw is in the open position so as to prevent the jaw from moving into the closed position; and a release member pivotally attached to the distal end portion of the release arm;

wherein the proximal end portion of the release arm is below a bottom perimeter of the top plate and is pivotally attached at or below the bottom perimeter of the top plate via a first removable element, and wherein an end portion of the release member is below the bottom perimeter of the top plate and is connected at or below the bottom perimeter of the top plate via a second removable element, such that the release arm and the release member are removable from the fifth wheel while the fifth wheel is assembled to a vehicle by removing the first removable element and the second removable element.

16. The fifth wheel of claim 15, wherein the release member includes a release cylinder connected to the top plate and pivotally connected to a secondary lock latch so that the secondary lock latch is pivoted from a locked position to an unlocked when the release cylinder is activated.

17. The fifth wheel of claim 16, further comprising a retaining bracket removably attached to the top plate, wherein the retaining bracket is removable from the fifth wheel while the fifth wheel is assembled to a vehicle, and wherein the retaining bracket is removed prior to removing the release arm, the trigger member, the secondary lock latch, and release cylinder as a unit.

18. The fifth wheel of claim 16, wherein the jaw is removable from a bottom of the fifth wheel after the removal of the release arm, the trigger member, the secondary lock latch, and release cylinder.

19. The fifth wheel of claim 15, wherein the first removable element and the second removable element are removable screws.

20. The fifth wheel of claim 19, wherein at least the release arm, the trigger member, and release member are removable as a unit from a bottom of the fifth wheel while the fifth wheel is assembled to the vehicle after removal of the first removable screw and the second removable screw.

21. The fifth wheel of claim 15, further comprising one or more top wear plates removably fixed to a top surface of the top plate.

22. The fifth wheel of claim 21, wherein the jaw has at least one opening therein that enables a user to grip the jaw when the top wear plates are removed.

23. The fifth wheel of claim 15, further comprising at least one of a throat wear plate removably attached to the top plate and a mouth wear plate removably attached to a side surface of the top plate adjacent to the throat.

24. The fifth wheel of claim 15, further comprising a switch that detects when the jaw is in the closed position and provides an indication signal.

25. The fifth wheel of claim 24, wherein the indication signal comprises a visual and/or audible indicator in a cab of a vehicle to which the fifth wheel is attached.

* * * * *

UNITED STATES PATENT AND TRADEMARK OFFICE
CERTIFICATE OF CORRECTION

PATENT NO. : 9,302,557 B2
APPLICATION NO. : 14/100417
DATED : April 5, 2016
INVENTOR(S) : Steven Alldredge et al.

Page 1 of 1

It is certified that error appears in the above-identified patent and that said Letters Patent is hereby corrected as shown below:

In the Claims

In column 8, claim 16, line 25, after "unlocked" insert --position--.

Signed and Sealed this
Thirty-first Day of May, 2016

Michelle K. Lee
*Director of the United States Patent and Trademark Office*